(12) United States Patent
Matthews

(10) Patent No.: US 6,554,554 B1
(45) Date of Patent: Apr. 29, 2003

(54) TILT ACTION FASTENER

(76) Inventor: Norman Leslie Matthews, Box 736, Claremont W.A. 6010 (AU)

( * ) Notice: Subject to any disclaimer, the term of this patent is extended or adjusted under 35 U.S.C. 154(b) by 0 days.

(21) Appl. No.: 09/673,844

(22) PCT Filed: Apr. 23, 1999

(86) PCT No.: PCT/AU99/00313

§ 371 (c)(1),
(2), (4) Date: Jan. 8, 2001

(87) PCT Pub. No.: WO99/56024

PCT Pub. Date: Nov. 4, 1999

(30) Foreign Application Priority Data

Apr. 23, 1998 (AU) ............................................. PP3152

(51) Int. Cl.[7] ................................................. F16B 39/02
(52) U.S. Cl. ........................ 411/432; 411/917; 411/936
(58) Field of Search .............................. 411/936, 275, 411/230, 432, 142, 916, 917, 14.5, 433

(56) References Cited

U.S. PATENT DOCUMENTS

| | | | | |
|---|---|---|---|---|
| 171,898 A | * | 1/1876 | Wiles | |
| 222,220 A | * | 12/1879 | Wynkoop | |
| 291,328 A | * | 1/1884 | Garvey | |
| 1,092,155 A | * | 4/1914 | March | |
| 1,447,578 A | * | 3/1923 | Thomas | |
| 3,176,745 A | * | 4/1965 | Nyborg | |
| 4,557,652 A | * | 12/1985 | Lundgren | |
| 5,388,942 A | * | 2/1995 | Bonacina | |
| 5,795,119 A | * | 8/1998 | Goellner | |
| 5,906,401 A | * | 5/1999 | Viegener | |
| 6,050,741 A | * | 4/2000 | Aultman | |
| 6,112,396 A | * | 9/2000 | Steinbock | |
| 6,179,512 B1 | * | 1/2001 | Gibson | |

FOREIGN PATENT DOCUMENTS

| | | | |
|---|---|---|---|
| BE | 501432 | * | 5/1952 |
| GB | 128516 | * | 6/1919 |

* cited by examiner

*Primary Examiner*—Flemming Saether (57) ABSTRACT

A threaded fastener arranged to engage with a threaded shaft and tighten an object to the shaft by stretching the threaded shaft approximately parallel to its own axis. The threaded fastener is arranged so that when screwed on to the shaft the contacting surface are not parallel, thereby leaving a gap. The threaded fastener further comprises a tilting means of levering the surfaces away from one another and enlarging the gap between the surfaces. The tilting means may comprise an additional threaded shaft being threaded into an additional threaded aperture in the fastener or a ball bearing located in a groove on the surface of the fastened and contacting the surface of the object. The tilting means stretches the threaded shaft without bending the bolt requiring far less torque for stretching than a conventional nut and bolt tightened with a wrench.

14 Claims, 9 Drawing Sheets

TILT ACTION FASTENER

BRIEF DESCRIPTION OF THE INVENTION

The present invention relates to an improved fastener, in particular, a threaded type fastener.

FIELD OF THE INVENTION

Threaded fasteners have almost universal application in all forms of machinery, vehicles and structures. The most commonly used form of threaded fastener is the simple nut and bolt. This type of device has common problems associated with its use, especially in regard to fastening of dynamic parts, for example the fastening of a grinding disc to an angle grinder. In this type of situation the nut and bolt are commonly arranged such that rotation of the device will cause the nut to tighten during use. This, however, results in the situation where difficulty can be encountered in subsequently removing the nut.

A number of devices have been previously applied to these situations to attempt to alleviate this type of problem. For example, nuts with low friction bearings have been applied prevent over tightening. These devices, however, have the disadvantages of using expensive or complex parts.

The present invention seeks to alleviate some of the aforementioned problems.

SUMMARY OF THE INVENTION

In accordance with one aspect of the present invention there is provided a fastener characterized in that it includes a nut arranged to engage with a threaded shaft and having a first surface arranged to be screwed down against a contact surface, the first surface of the nut having a first side and a second side, the first side being arranged to come into contact with the contact surface before the second side leaving a gap between the second side and contact surface and the nut also having at least one tilting means adjacent the second side, the tilting means being arranged to engage with the contact surface and vary the size of the gap, and may be used on the backside of the fastened object.

DESCRIPTION OF THE DRAWINGS

The present invention will now be described by way of example with reference to the accompanying drawings in which.

DESCRIPTION OF THE INVENTION

Figure 1:
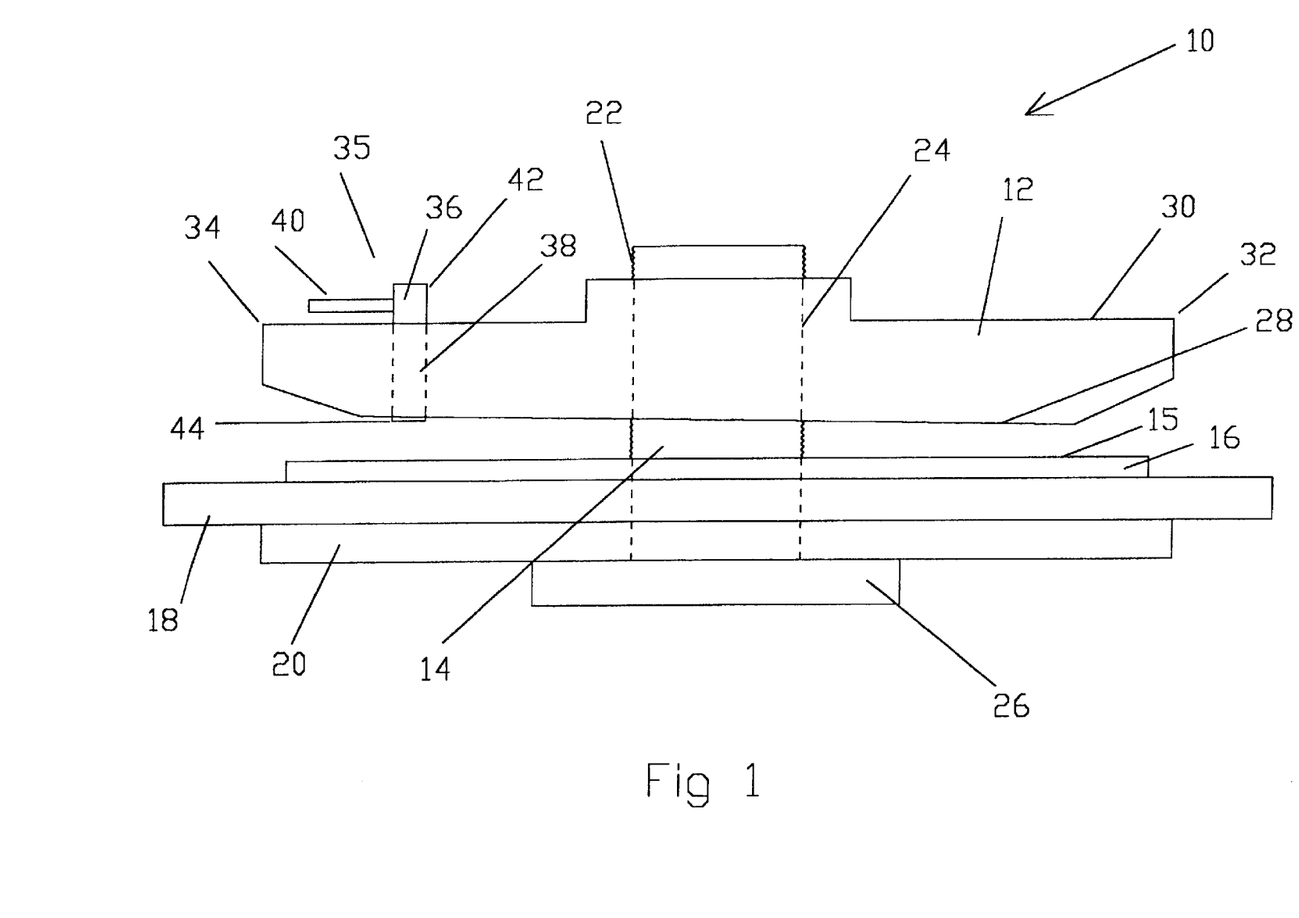
FIG. 1 is a side view of a fastener in accordance with the present invention in a nut disengaged position.
Figure 2:
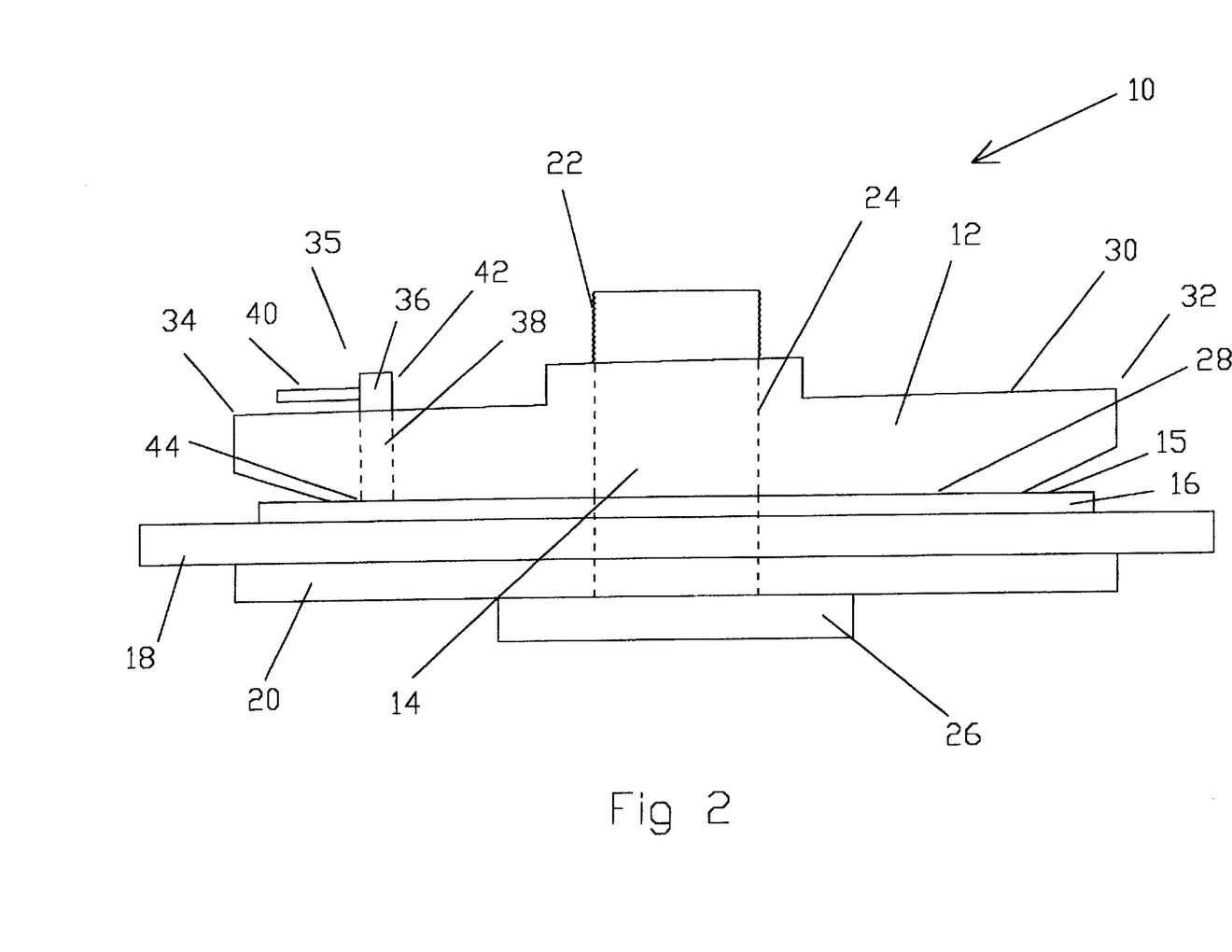
FIG. 2 is a side view of the fastener of FIG. 1 in a first nut engaged position.
Figure 3:
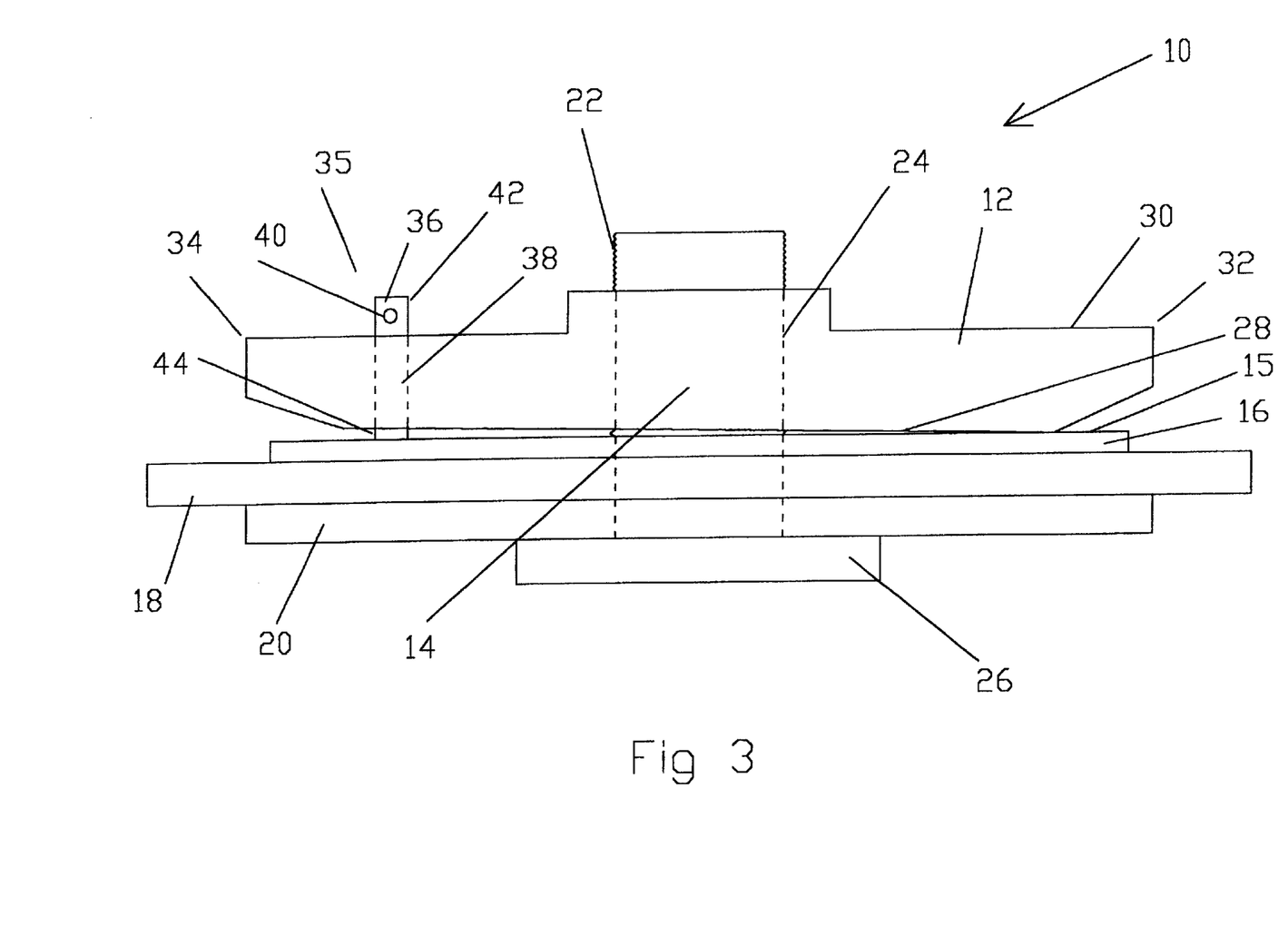
FIG. 3 is a side view of the fastener of FIG. 1 in a second nut engaged position.

In FIGS. 1 to 3 of the accompanying drawings, there is shown a fastener 10 in accordance with the present invention including a nut 12 a bolt 14 and a washer 16. The bolt 14 includes a threaded shaft end 22 and a head end 26. Shown also in FIGS. 1 to 3 are a first plate 18 and a second plate 20 which are to be fastened together. The first and second plates 18 and 20 are each provided with an aperture. The apertures are arranged to be alignable and able to receive the threaded shaft end 22 of the bolt 14. The plates 18 and 20 represent any two objects, or more than two that may be desired to be fastened together. For example, the first plate 18 may be a grinding disc for an angle grinder and the second plate 20 and bolt 14 may together represent the base of the grinder to which the disc is to be attached, fastened or removed.

The nut 12 includes a threaded aperture 24 having a suitably sized thread to receive the threaded shaft 22 of the bolt 14. The nut 12 includes a first surface 28 and a second surface 30. The second surface 30 is remote from the head 26 of the bolt 14 and is arranged to be generally perpendicular to the threaded shaft 22 of the bolt 14 when the threaded shaft 22 is received within the threaded aperture 24 of the nut 12.

The first surface 28 is opposed to the second surface 30 and is arranged at an angle to the second surface 30. The nut has a first side 32 and second side 34, remote from the first side 32 whereby the thickness of the nut 12 is greater at the first side 32 than the second side 34 due to the angled first surface 28. The difference in thickness of side 32 to 36 is precise relevant to the distance of tilt to tension, or loosening.

Also provided is a tilting means 35 adjacent the second side 34 of the nut 12. The tilting means 35 is one example of a tilting means only in the form of a screw 36 arranged to be received within a threaded aperture 38 in the nut 12. The screw 36 is provided with a lever 40 at a first end 42, on one side. The first end 42 is arranged adjacent the second surface 30 of the nut 12 when the screw 36 is threaded through the aperture 38. The lever 40 is arranged such that turning the lever 40 in one direction results in a second end 44 of the screw 36 protruding through the first surface 28 of the nut 12. Turning the lever 40 in the other direction causes the second end 44 of the screw 36 to be retracted within the nut 12, so that it does not protrude past the first surface 28.

When the nut 12 is threaded down the bolt 14 it comes up against a contact surface 15. The contact surface 15 is in the form of a washer 16, provided to be inserted over the threaded shaft 22 of the bolt 14 between the first plate 18 and the nut 12. The washer 16 may alternatively be pivotally attached to the nut 12.

In use, the bolt 14 is inserted through the apertures of the plates 18 and 20. The washer 16 is then placed over the bolt 14 and the nut 12 is screwed onto the threaded shaft 22 of the bolt 14 as can be seen in FIG. 1.

The nut 12 is then screwed down further onto the bolt 14 until it comes into contact with the washer 16. Due to the angled first surface 28, the first side 32 of the nut 12 will come into contact with the washer 16 first. At this point there will still be a gap between the washer 16 and the nut 12 adjacent the second side 34. The nut 12 is then screwed down further until the first surface 28 is now perpendicular to the threaded shaft 22 of the bolt 14 and rests flat against the washer 16 as shown in FIG. 2. This tilting of the nut is able to occur due to the fact that there will always exist some clearance between the thread of a bolt and of a nut. Also, the first contact of the nut 12 with the contact surface 15 will also cause the threaded shaft 22 to flex sideways. The nut 12 need not tilt fully depending upon shaft 22 clearance and the tension required.

The lever 40 of the screw 36 is now turned to extend the second end 44 of the screw below the first surface 28 of the nut 12. The lever 40 is turned to extend the second end 44 of the screw 16 a sufficient distance such that the nut 12 is tilted back until the second surface 30 is again perpendicular to the threaded shaft 22 of the bolt 14, as shown in FIG. 3. Preferably, lugs or stoppers (not shown) are provided on the second surface 30 of the nut 12 to limit travel of the lever 40 between a first position where the second end 44 of the screw 36 is level with or retracted within the first surface 28 and a second position where the second end 44 of the screw 36 is extended sufficiently to level the nut 12 as previously described. A spring to give lever 40 automatic return may be provided.

The leveling of the nut 12 increases the tension between the internal thread of the nut 12 and the threaded shaft 22 of the bolt 14. The pressure thereby created by friction on the threads and contact points under the nut 12 secures the nut 12 in position relative to the bolt 14.

In a device where the first and second plates 18 and 20 are to be secured for rotation, the lever 40 is preferably arranged to be turned opposite to the direction of rotation to the tool spindle of shaft 22. This prevents any forces, such as a centrifugal force, acting on the lever 40 in a direction that would tend to release the fastener 10. Preferably also, the screw 36 is of small size to also prevent loosening. To release the nut 12, the lever free end 40 is turned in the opposite direction to retract the second end 44 of the screw 36 until it is level with or below the first surface 28 of the nut 12. The tension between the nut 12 and the threaded shaft 22 of the bolt 14 is released and the nut 12 returns to the tilted position as shown in FIG. 2. The nut 12 then may be easily removed from the bolt 14.

In the case of a dynamic situation such as an angle grinder, the nut 12 may be screwed down with the screw 36 already extended as shown in FIG. 3. The rotation will then cause the nut 12 to automatically tighten. The nut 12 can then be released as previously described.

Figure 4:
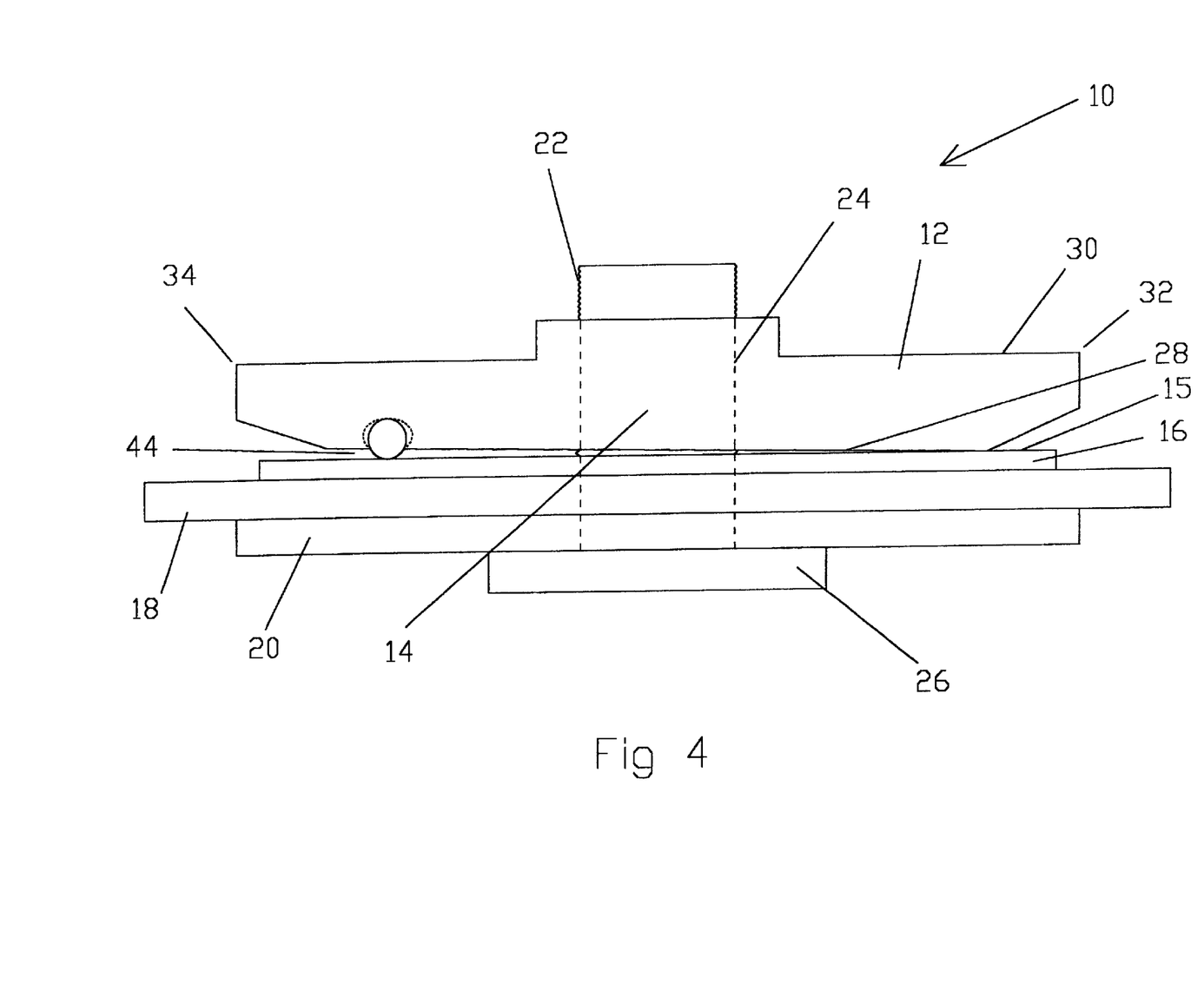
FIG. 4 is an alternate embodiment of the fastener of FIG. 1.
Figure 5:
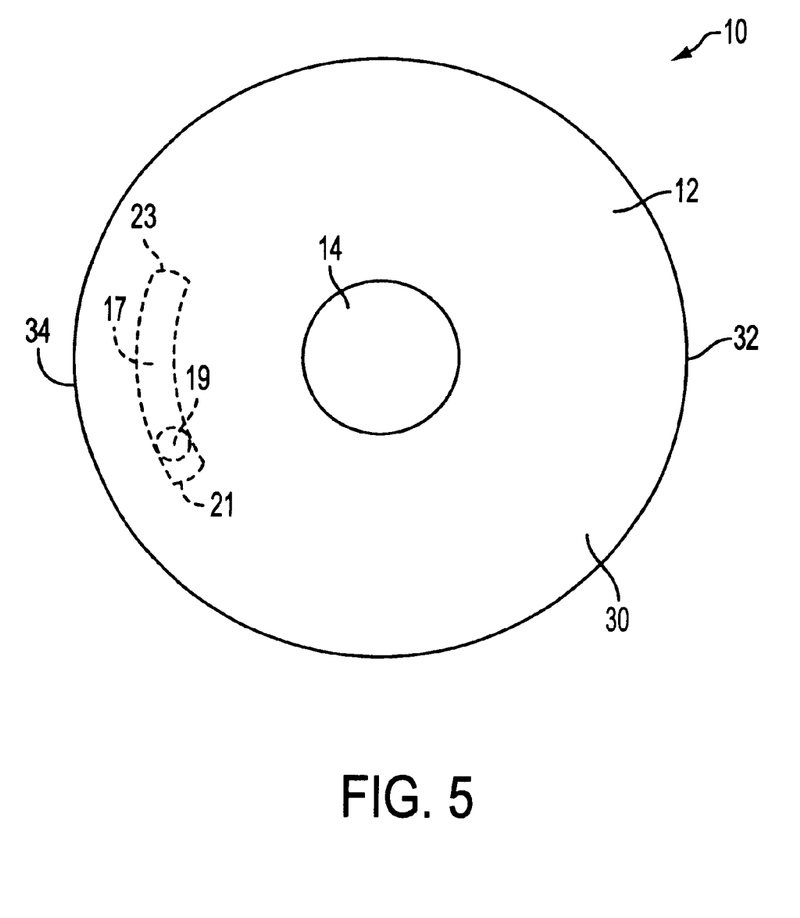
FIG. 5 is a top cross-sectional view of the nut of FIG. 4.
Figure 6A:
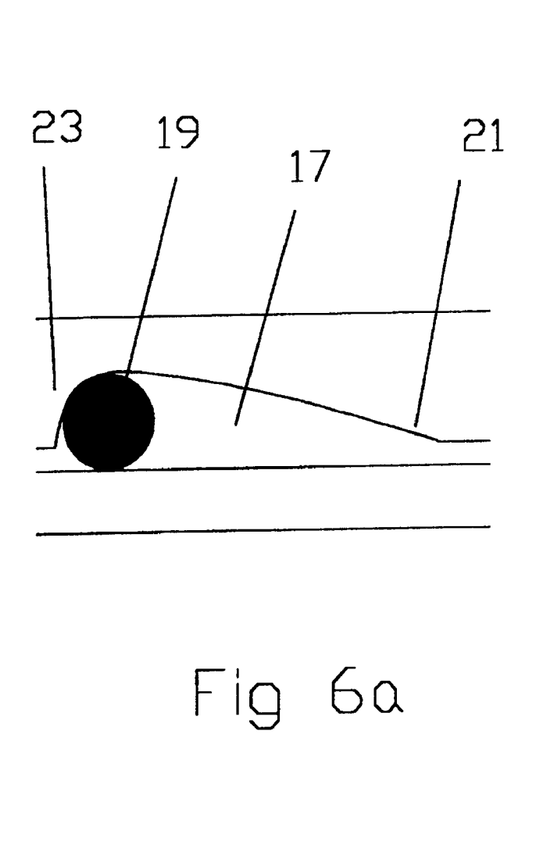
FIG. 6a is a side cross sectional view of the groove of FIG. 5 in a disengaged position.
Figure 6B:
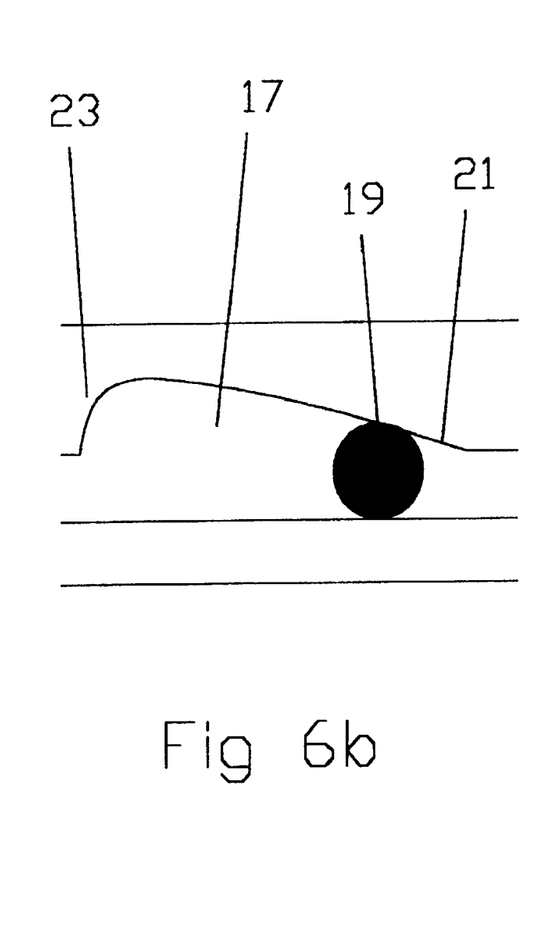
FIG. 6b is a side cross sectional view of the groove of FIG. 5 in an engaged position.

In FIGS. 4 to 6 is shown an alternate embodiment of a fastener 10 in accordance with the present invention. In this embodiment, the tilting means is formed by at least one ball bearing 19. The ball bearing 19 is contained within an arcuate groove 17 in the first surface 28 of the nut 12 adjacent the second end 34. The arcuate groove 17 has a first end 21 and a second end 23. The depth of the groove 17 is arranged to be shallower at the first end 21 than the second end 23, as can be seen in FIGS. 6a and 6b. When the ball bearing 19 is located adjacent the first end 21 of the groove 17 it protrudes below the first surface 28 and it is located adjacent the second end 23 of the groove 17 it is contained fully within the groove 17.

When the nut 12 is screwed down, the ball bearing 19 moves to the first end 21 of the groove 17 and protrudes below the first surface 28, acting in a similar manner to the screw of FIGS. 1 to 3. When the nut 12 is released, the ball bearing 19 moves towards the second end 23 of the groove 17 and releases the nut 12.

Figure 7:
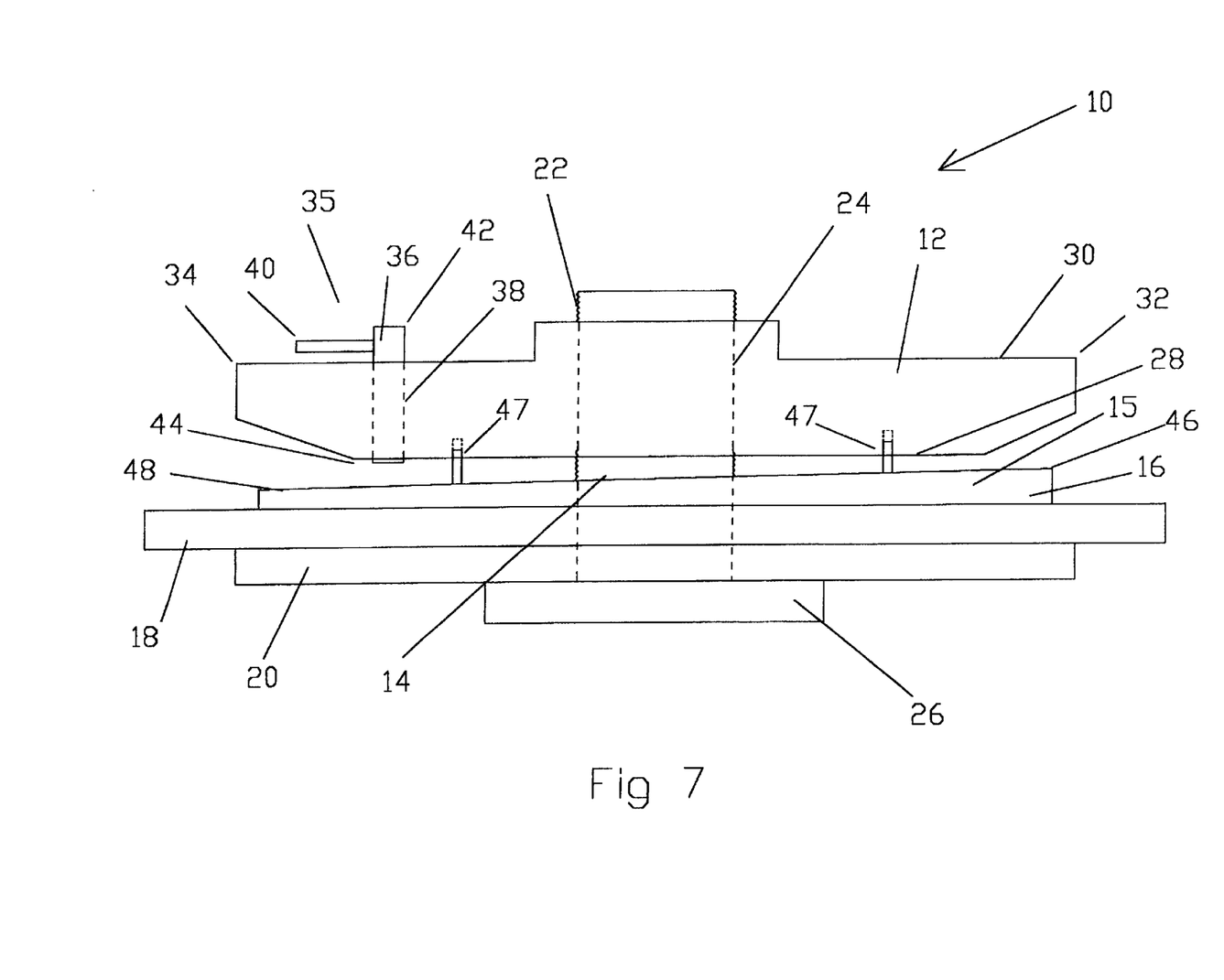
FIG. 7 is an alternate embodiment of the fastener of FIG. 1.

FIG. 7 illustrates an alternate embodiment of the fastener of FIGS. 1 to 3 in accordance with the present invention. As shown in FIG. 7, the first surface 28 of the nut is not angled. The first surface 28 is parallel to the second surface 30 which is perpendicular to the threaded shaft 22 of the bolt 14. The washer 16 in this case includes an angled surface 15. Due to the angled surface 48, the washer 16 has a greater thickness at a first end 46 thereof, than the thickness at second end 34. In use, the fastener 10 operates in the same way as the fastener 10 of FIGS. 1 to 3. The first end 46 of the washer 16 must be positioned such that it is opposite the screw 36 of the nut 12. The washer 16 would preferably be pinned to the nut 12 by pins 47 to ensure this condition.

Figure 8:
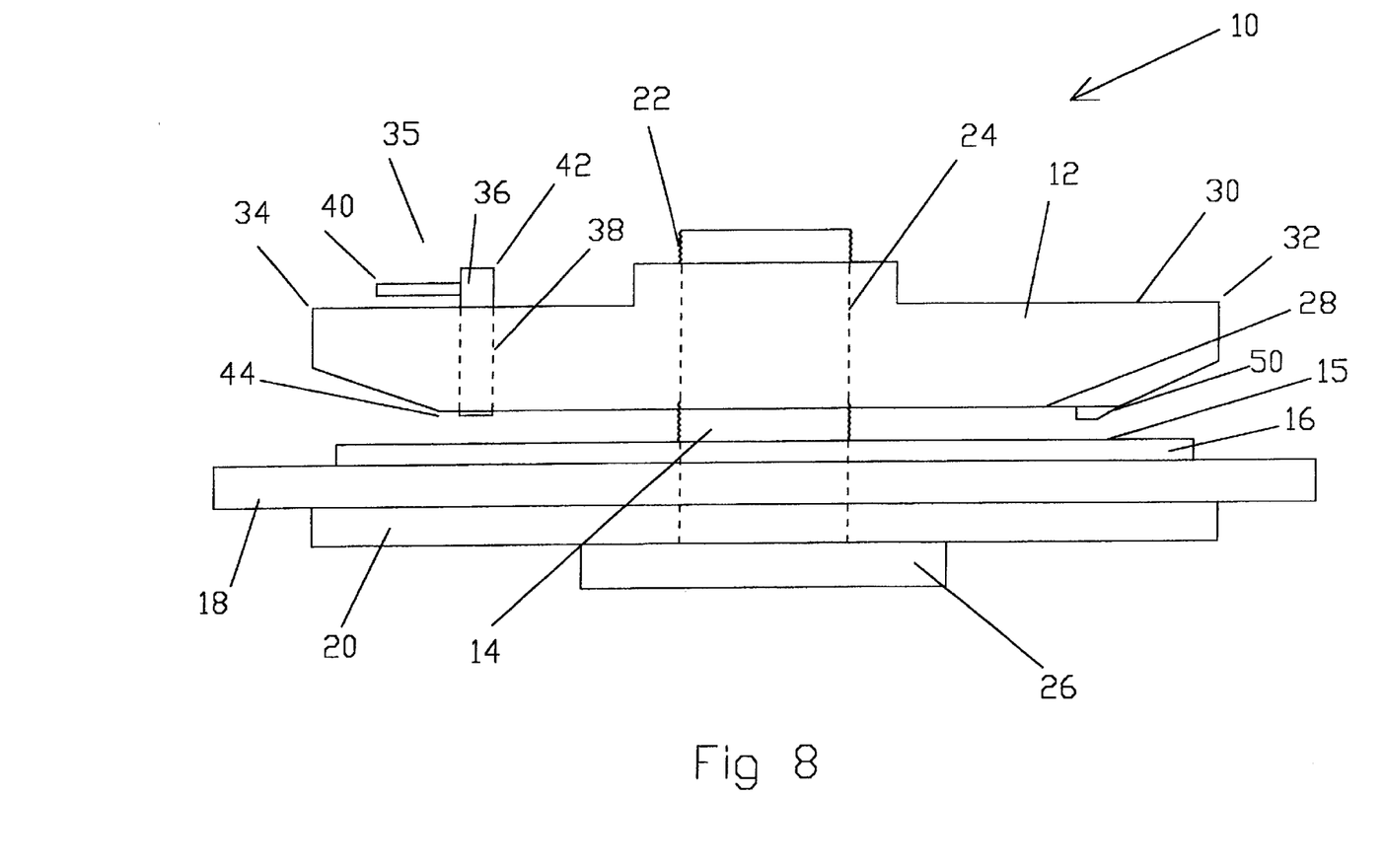
FIG. 8 is an another alternate embodiment of the fastener of FIG. 1.

FIG. 8 shows another alternate embodiment of the fastener 10 of FIGS. 1 to 3. In this embodiment the first surface 28 is parallel to the second surface 30 as in the embodiment of FIG. 7. A lug 50 is provided on the first surface 28 adjacent the first side 32 of the nut 12. The lug 40 produces the same tilting effect as the angled first surface 28, FIGS. 1 to 3.

Figure 9A:
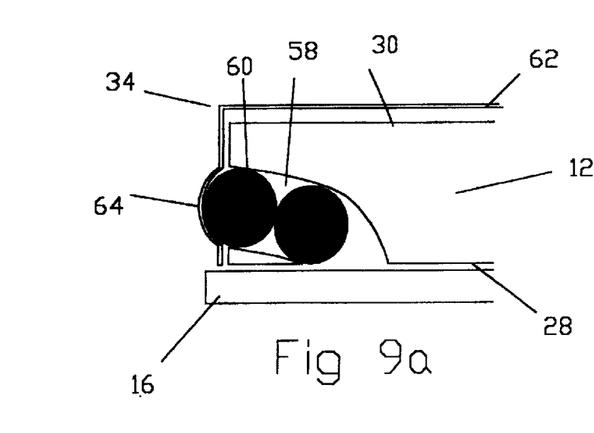
FIG. 9a is a side cross sectional view of an alternate tilting means of a fastener in accordance with the present invention in a disengaged position.
Figure 9B:
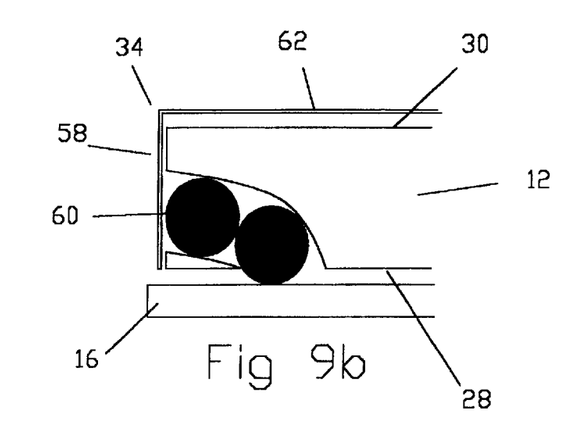
FIG. 9b is a side cross sectional view of the tilting means of FIG. 9a in an engaged position.

FIGS. 9a and 9b and 10a and 10b show further alternate embodiment of the tilting means 35. In FIGS. 9a and 9b the second side 34 of nut 12 includes a curved aperture 58 in the first surface 28 on or near the outer edge 34 of the nut 12. A plurality of ball bearings 60 are contained within the curved aperture 58. A cover ring 62 is provided to fit over the nut 12 and includes a recess 64 adjacent the outer edge of the nut 12. The ring 62 may be rotated from a first position in which the recess 64 is in alignment with the curved aperture 58 to a second position in which it is out of alignment with the curved aperture 58. When in the second position, the ring 62 forces the ball bearings 60 to protrude below the first surface 28. In the first position, the ball bearings 60 move partially into the recess 64 to release the nut 12.

Figure 10A:
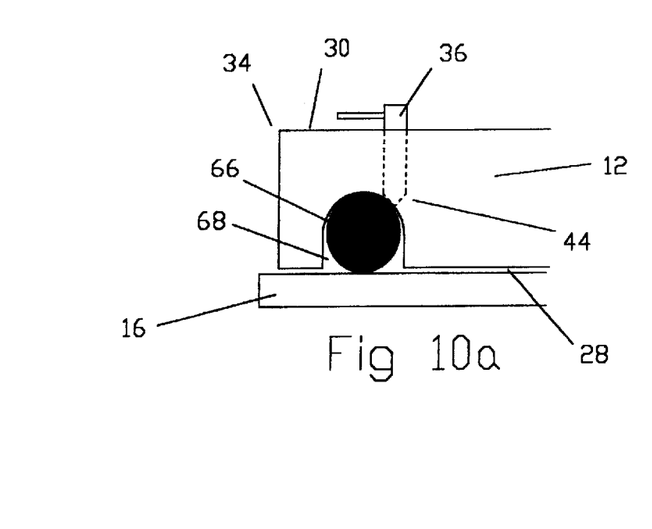
FIG. 10a is a side cross sectional view of an another alternate tilting means in accordance with the present invention in a disengaged position.
Figure 10B:
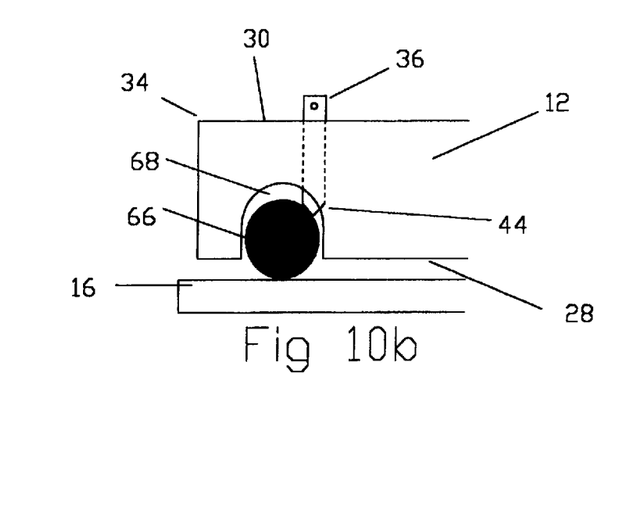
FIG. 10b is a side cross sectional view of the tilting means of FIG. 10a in an engaged position.

In FIGS. 10a and 10b the nut 12 is provided with a groove 66 in the first surface 28. A ball bearing 68 is provided in the groove 66. The screw 36 is arranged to come into contact with the ball bearing 68 and force the ball bearing 68 to protrude past the first surface 28. The screw 36 further includes a tapered second end 44, In another alternate embodiment, the lever mechanism 40 of the screw 36 may be detachable from the screw 36 or be replaced by a suitable arrangement for receiving a tool. For example, the screw 36 may be provided with a recess in the first end 42 instead of the lever 40. The recess would be arranged to be suitable for receiving a tool such as an Allen key.

In a further embodiment, the first end 42 of the screw 36 may reside in a recess provided in the second surface 30 of the nut 12. This would provide protection for the screw 36 to prevent it from being damaged or catching on something. The recess may also be provided with cover to further protect the first end 42 of the screw 36. Modifications and variations such as would be apparent to a skilled addressee are deemed to be within the scope of the present invention.

What is claimed is:

1. A fastening system comprising:
   a threaded shaft having a head arranged to be fastened to an object having a contact surface;
   a nut with a threaded aperture adapted to engage the threaded shaft;
   a bottom surface of the nut adapted to be screwed down against the contact surface;

the bottom surface of the nut not being perpendicular to the axis of the threaded aperture; and the fastening system further comprising at least one tilting means associated with the nut for levering the bottom surface of the nut away from the contact surface, creating tension in the threaded shaft from the head of the threaded shaft to the nut.

2. A fastening system according to claim 1:

wherein the tilting means comprises at least one screw threaded through a second threaded aperture in the nut, and an end of the screw adapted to push against the contact surface.

3. A fastening system according to claim 2:

wherein the tilting means further comprises a lever attached to at least one screw for rotating the screw.

4. A fastening system comprising:

a threaded shaft having a head arranged to be fastened to an object having a contact surface;

a nut with a threaded aperture adapted to engage the threaded shaft;

a bottom surface of the nut adapted to be screwed down against the contact surface;

the bottom surface of the nut not being perpendicular to the axis of the threaded aperture; and the fastening system further comprising at least one tilting means associated with the nut for levering the bottom surface of the nut away from the contact surface, creating tension in the threaded shaft from the head of the threaded shaft to the nut;

wherein the tilting means comprises at least one ball bearing contained within a groove on the bottom surface of the nut, and wherein the groove is deeper at one end than at another end.

5. A fastening system comprising:

a threaded shaft having a head arranged to be fastened against a contact surface;

a nut with a threaded aperture adapted to engage the threaded shaft;

a bottom surface of the nut adapted to be screwed down against a top surface of a washer;

a the top surface of the washer not being perpendicular to the axis of the threaded aperture when a bottom surface of the washer is positioned perpendicular to the axis of the threaded aperture; and at least one tilting means associated with the nut for levering the nut against the washer, tensioning the threaded shaft from the head of the threaded shaft to the nut.

6. A fastening system according to claim 5:

wherein the washer is pivotally connected to the nut.

7. A fastening system according to claim 6:

wherein the tilting means comprises at least one screw threaded through a second threaded aperture in the nut; and an end of the screw adapted to push against the washer.

8. A fastening system according to claim 7:

wherein the tilting means further comprises a lever attached to at least one screw for rotating the screw.

9. A fastening system according to claim 5:

wherein the tilting means comprises at least one screw threaded through a second threaded aperture in the nut; and an end of the screw adapted to push against the washer.

10. A fastening system according to claim 9 wherein:

the tilting means further comprises a lever attached to at least one screw for rotating the screw.

11. A fastening system comprising:

a threaded shaft having a head arranged to be fastened against a contact surface;

a nut with a threaded aperture adapted to engage the threaded shaft;

a bottom surface of the nut adapted to be screwed down against a top surface of a washer;

the top surface of the washer not being perpendicular to the axis of the threaded aperture when a bottom surface of the washer is positioned perpendicular to the axis of the threaded aperture;

at least one tilting means associated with the nut for levering the nut against the washer, tensioning the threaded shaft from the head of the threaded shaft to the nut;

wherein the tilting means comprises at least one ball bearing contained within a groove on the bottom surface of the nut, and wherein the groove is deeper at one end than at another end.

12. A method for fastening a threaded shaft to a contact surface comprising the steps of:

screwing down a nut with a threaded aperture and a bottom surface not parallel to the contact surface on the threaded shaft until the nut and the contact surface make contact along a line; and stretching the threaded shaft along its axis by levering the end of the nut not in contact with the contact surface away from the contact surface.

13. A method for fastening a threaded shaft to a contact surface according to claim 12 wherein stretching the threaded shaft along its axis is accomplished by screwing a second threaded shaft through a second threaded aperture in the nut arranged to push the nut away from the contact surface.

14. A method for fastening a threaded shaft to a contact surface comprising the steps of:

screwing down a nut with a threaded aperture and a bottom surface not parallel to the contact surface on the threaded shaft until the nut and the contact surface make contact along a line; and stretching the threaded shaft along its axis by levering the end of the nut not in contact with the contact surface away from the contact surface;

wherein stretching the threaded shaft along its axis is accomplished by moving a ball bearing located in a groove on the bottom surface of said nut from a deeper end of said groove to another end of said groove.

* * * * *